US012437911B2

(12) United States Patent
Jung et al.

(10) Patent No.: US 12,437,911 B2
(45) Date of Patent: Oct. 7, 2025

(54) COIL COMPONENT

(71) Applicant: SAMSUNG ELECTRO-MECHANICS CO., LTD., Suwon-si (KR)

(72) Inventors: Jung Hyuk Jung, Suwon-si (KR); Ji Young Park, Suwon-si (KR); Yu Jung Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 1103 days.

(21) Appl. No.: 17/369,164

(22) Filed: Jul. 7, 2021

(65) Prior Publication Data

US 2022/0181065 A1 Jun. 9, 2022

(30) Foreign Application Priority Data

Dec. 9, 2020 (KR) ........................ 10-2020-0171058

(51) Int. Cl.
*H01F 27/25* (2006.01)
*H01F 17/04* (2006.01)
(Continued)

(52) U.S. Cl.
CPC ........... *H01F 27/255* (2013.01); *H01F 17/04* (2013.01); *H01F 27/022* (2013.01);
(Continued)

(58) Field of Classification Search
CPC ...... H01F 27/255; H01F 17/04; H01F 27/022; H01F 27/2847; H01F 27/292; H01F 41/02; H01F 2017/048; H01F 2027/2857
See application file for complete search history.

(56) References Cited

U.S. PATENT DOCUMENTS 11,749,447 B2 * 9/2023 Gibu ........................ H01F 27/29 336/192
2014/0145814 A1 * 5/2014 Lee ..................... H01F 17/0013 336/200
(Continued)

FOREIGN PATENT DOCUMENTS

KR 10-2013-0100717 A 9/2013
KR 10-1580411 B1 12/2015
(Continued)

OTHER PUBLICATIONS

Office Action issued in corresponding Korean Patent Application No. 10-2020-0171058 on Apr. 23, 2025, with English translation.

*Primary Examiner* — Malcolm Barnes
(74) *Attorney, Agent, or Firm* — MORGAN, LEWIS & BOCKIUS LLP

(57) ABSTRACT

A coil component includes a body having a first surface and a second surface opposing each other and a plurality of wall surfaces connecting the first surface to the second surface, and including insulating resin and magnetic metal powder particles; an insulating substrate disposed in the body; a coil portion disposed on the insulating substrate and including a lead-out pattern exposed to a first wall surface of the plurality of wall surfaces of the body; and an external electrode disposed on the body and connected to the lead-out pattern. Some of the magnetic metal powder particles are exposed to each of the plurality of wall surfaces of the body. The magnetic metal powder particles exposed to the first wall surface of the body have a cut-out surface. The magnetic metal powder particles exposed to a second wall surface connected to the first wall surface of the plurality of wall surfaces of the body do not have a cut-out surface.

20 Claims, 10 Drawing Sheets

(51) Int. Cl.

| | |
|---|---|
| ***H01F 27/02*** | (2006.01) |
| ***H01F 27/255*** | (2006.01) |
| ***H01F 27/28*** | (2006.01) |
| ***H01F 27/29*** | (2006.01) |
| ***H01F 41/02*** | (2006.01) |

(52) U.S. Cl.
CPC ....... *H01F 27/2847* (2013.01); *H01F 27/292* (2013.01); *H01F 41/02* (2013.01); *H01F 2017/048* (2013.01); *H01F 2027/2857* (2013.01)

(56) References Cited

U.S. PATENT DOCUMENTS

| | | | | |
|---|---|---|---|---|
| 2016/0012961 | A1* | 1/2016 | Suzuki | H01F 27/29 29/602.1 |
| 2016/0035476 | A1* | 2/2016 | Mimura | H01F 27/327 336/199 |
| 2016/0086714 | A1 | 3/2016 | Moon et al. | |
| 2016/0126004 | A1* | 5/2016 | Yang | H01F 27/292 336/90 |
| 2018/0261377 | A1* | 9/2018 | Kim | H01F 27/324 |
| 2019/0096568 | A1* | 3/2019 | Yoon | H01F 17/0013 |
| 2019/0326041 | A1* | 10/2019 | Kawaguchi | H01F 1/06 |
| 2020/0152370 | A1 | 5/2020 | Kang et al. | |
| 2020/0168391 | A1 | 5/2020 | Yang et al. | |
| 2021/0043367 | A1* | 2/2021 | Yoshioka | H01F 27/2828 |

FOREIGN PATENT DOCUMENTS

| | | | |
|---|---|---|---|
| KR | 10-2093147 | B1 | 3/2020 |
| KR | 10-2020-0055238 | A | 5/2020 |

* cited by examiner

COIL COMPONENT

CROSS-REFERENCE TO RELATED APPLICATION(S)

The present application claims the benefit of priority to Korean Patent Application No. 10-2020-0171058, filed on Dec. 9, 2020 in the Korean Intellectual Property Office, the disclosure of which is incorporated herein by reference in its entirety.

TECHNICAL FIELD

The present disclosure relates to a coil component.

BACKGROUND

An inductor, a coil component, is a representative passive electronic component used in electronic devices together with a resistor and a capacitor.

In the case of a thin-film coil component in which a coil may be formed on a support substrate by plating, coils and bodies of a plurality of individual components may be collectively formed (also referred to as a coil bar) on a large-area substrate, and the bodies of the plurality of individual components connected to each other may be separated by a dicing process. Thereafter, an external electrode and a surface insulating layer may be formed on the body of the component.

Since the plurality of individual components may form rows and columns in the coil bar in each of the length and width directions, both dicing in the length direction and dicing in the width direction may need to be performed in a general dicing process. However, as the dicing is performed twice, an alignment between a dicing line and a dicing saw may be dislocated, such that defects may increase.

SUMMARY

An aspect of the present disclosure is to provide a coil component which may omit a dicing process in one of a length direction L and a width direction W of a component.

According to an aspect of the present disclosure, a coil component includes a body having a first surface and a second surface opposing each other and a plurality of wall surfaces connecting the first surface to the second surface, and including insulating resin and magnetic metal powder particles; an insulating substrate disposed in the body; a coil portion disposed on the insulating substrate and including a lead-out pattern exposed to a first wall surface of the plurality of wall surfaces of the body; and an external electrode disposed on the body and connected to the lead-out pattern. Some of the magnetic metal powder particles are exposed to each of the plurality of wall surfaces of the body. The magnetic metal powder particles exposed to the first wall surface of the body have a cut-out surface. The magnetic metal powder particles exposed to a second wall surface connected to the first wall surface of the plurality of wall surfaces of the body do not have a cut-out surface.

According to another aspect of the present disclosure, a coil component includes a body having a first surface and a second surface opposing each other and a plurality of wall surfaces connecting the first surface to the second surface, and including insulating resin and magnetic metal powder particles; an insulating substrate disposed in the body; a coil portion disposed on the insulating substrate and including a lead-out pattern exposed to a first wall surface of the plurality of wall surfaces of the body; and an external electrode disposed on the body and connected to the lead-out pattern. Some of the magnetic metal powder particles are exposed to each of the plurality of wall surfaces of the body. An exposed portion of the magnetic metal powder particles exposed to the first wall surface of the body has a substantially flat surface. An exposed portion of the magnetic metal powder particles exposed to a second wall surface connected to the first wall surface of the body of the plurality of wall surfaces of the body does not have a substantially flat surface.

According to still another aspect of the present disclosure, a coil component includes a body including insulating resin and magnetic metal powder particles; an insulating substrate disposed in the body; a coil portion disposed on the insulating substrate and including a lead-out pattern exposed from the body; and an external electrode disposed on the body and connected to the lead-out pattern. Some of the magnetic metal powder are exposed to each of external surfaces of the body. Among all of the magnetic metal powder particles included in the body, only the magnetic metal powder particles exposed to a first surface of the body, to which the lead-out pattern is exposed, have a cut-out surface.

BRIEF DESCRIPTION OF DRAWINGS

The above and other aspects, features, and advantages of the present disclosure will be more clearly understood from the following detailed description, taken in conjunction with the accompanying lead-outs, in which.

DETAILED DESCRIPTION

Figure 1:
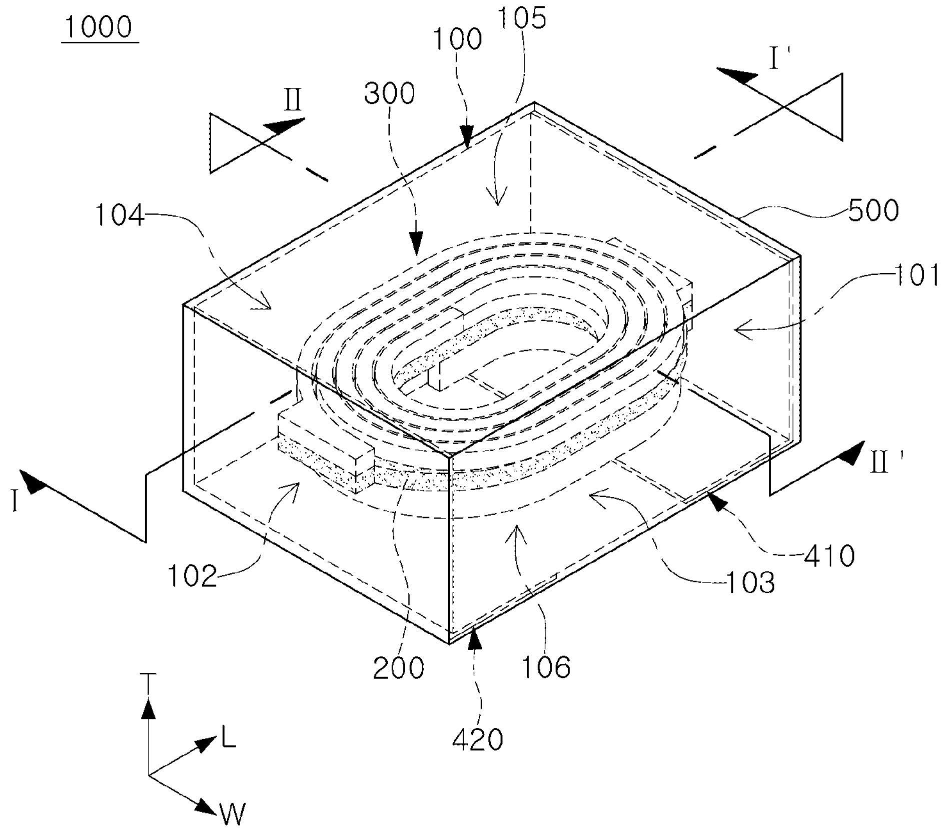
FIG. 1 is a perspective diagram illustrating a coil component according to an example embodiment of the present disclosure.

The terms used in the example embodiments are used to simply describe an example embodiment, and are not intended to limit the present disclosure. A singular term includes a plural form unless otherwise indicated. The terms, "include," "comprise," "is configured to," etc. of the description are used to indicate the presence of features, numbers, steps, operations, elements, parts or combination thereof, and do not exclude the possibilities of combination or addition of one or more features, numbers, steps, operations, elements, parts or combination thereof. Also, the term "disposed on," "positioned on," and the like, may indicate that an element is positioned on or beneath an object, and does not necessarily mean that the element is positioned on the object with reference to a gravity direction.

The term "coupled to," "combined to," and the like, may not only indicate that elements are directly and physically in contact with each other, but also include the configuration in which the other element is interposed between the elements such that the elements are also in contact with the other component.

Sizes and thicknesses of elements illustrated in the lead-outs are indicated as examples for ease of description, and example embodiments in the present disclosure are not limited thereto.

In the lead-outs, an L direction is a first direction or a length direction, a W direction is a second direction or a width direction, a T direction is a third direction or a thickness direction.

In the descriptions described with reference to the accompanied lead-outs, the same elements or elements corresponding to each other will be described using the same reference numerals, and overlapped descriptions will not be repeated.

In electronic devices, various types of electronic components may be used, and various types of coil components may be used between the electronic components to remove noise, or for other purposes.

In other words, in electronic devices, a coil component may be used as a power inductor, a high frequency inductor, a general bead, a high frequency bead, a common mode filter, and the like.

Figure 2:
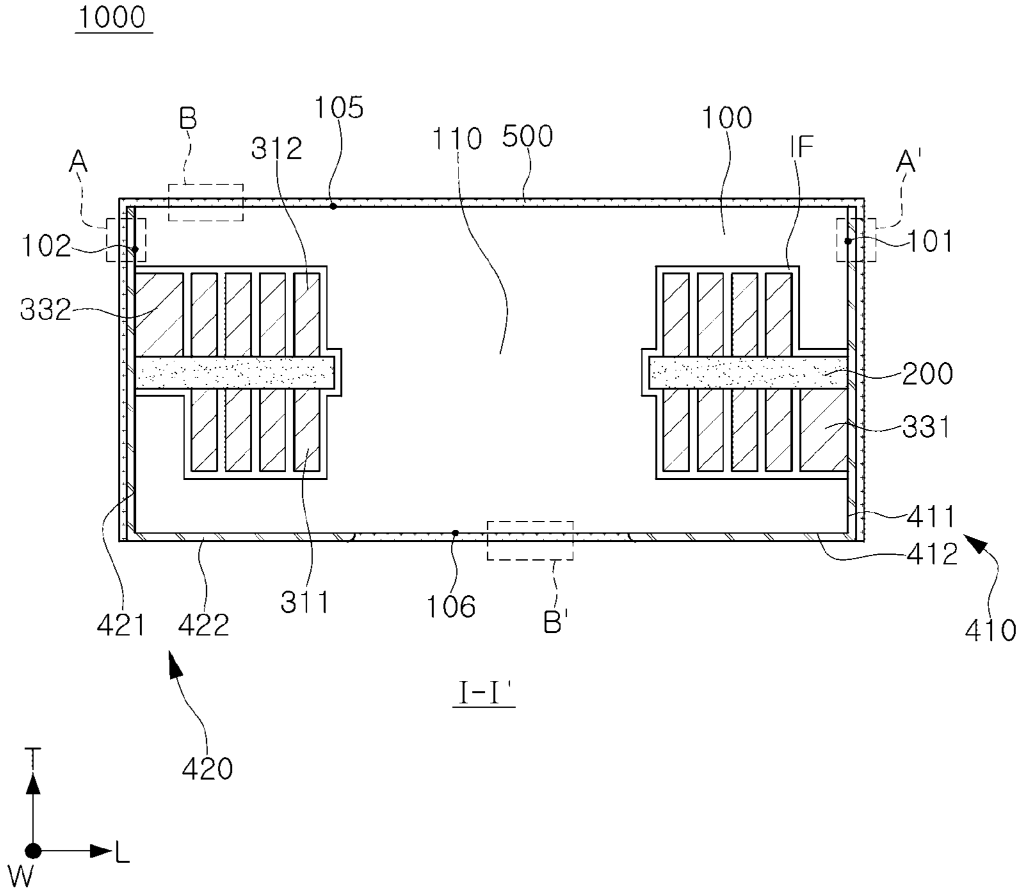
FIG. 2 is a cross-sectional diagram taken along line I-I' in FIG. 1.
Figure 3:
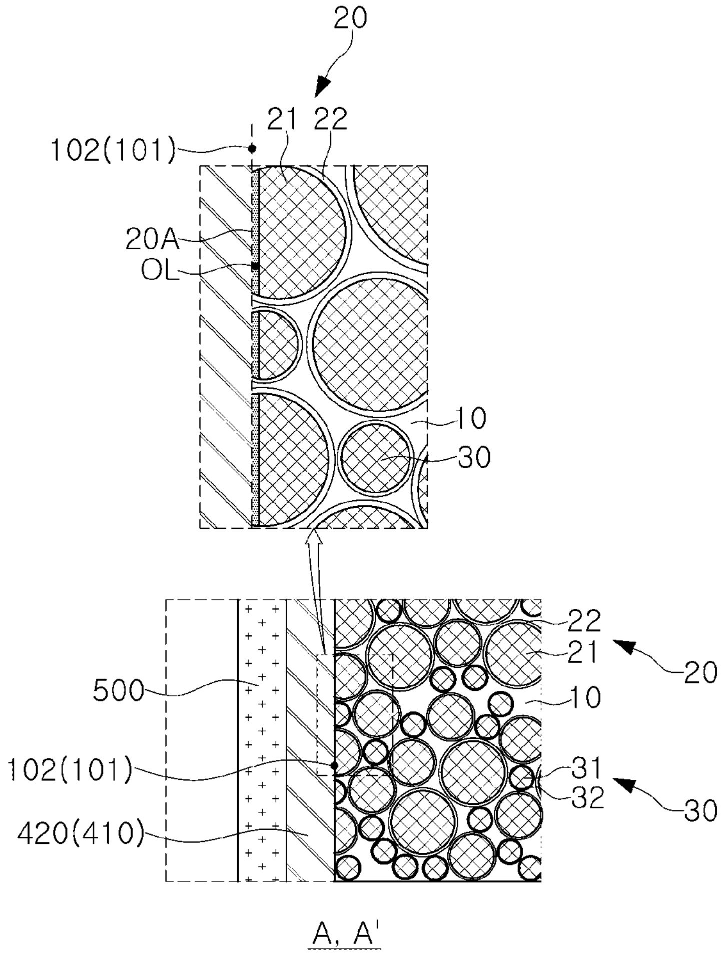
FIG. 3 is an enlarged diagram illustrating portion A in FIG. 1.
Figure 4:
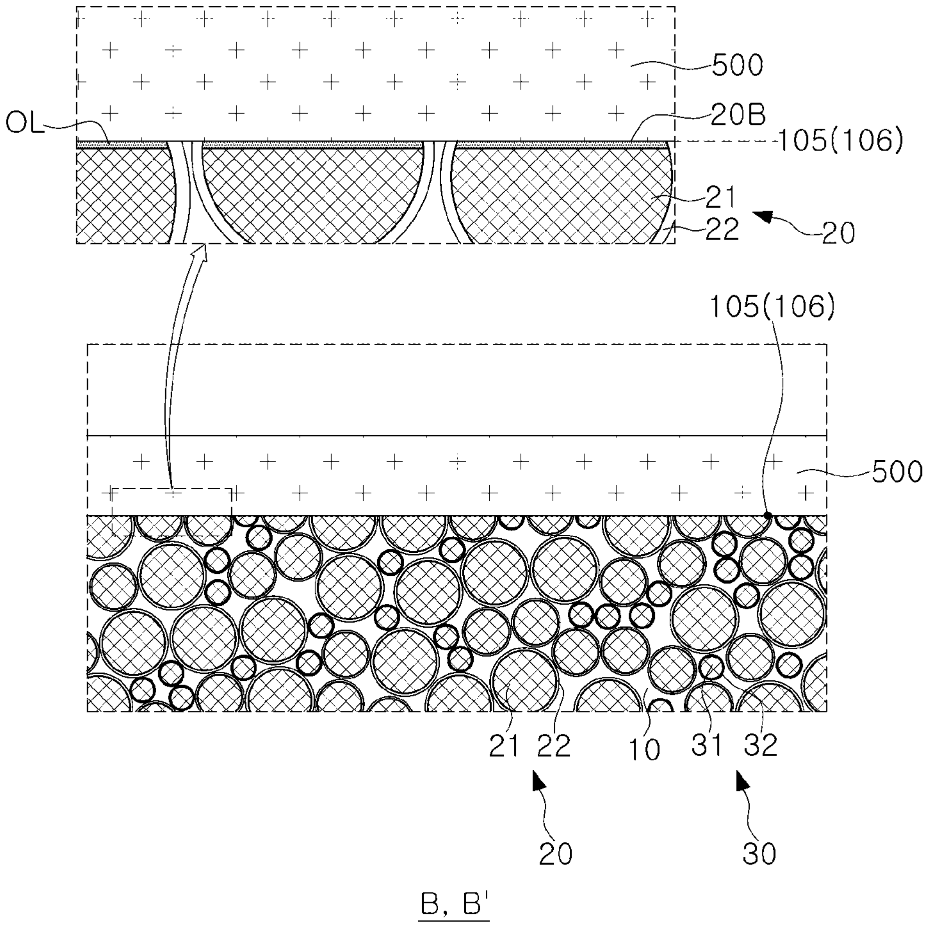
FIG. 4 is an enlarged diagram illustrating portion B in FIG. 1.
Figure 5:
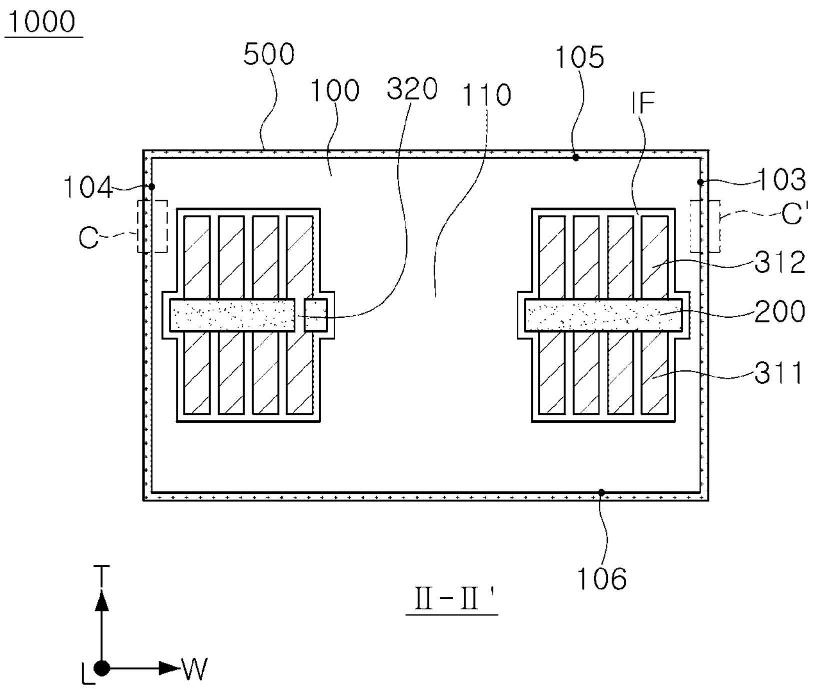
FIG. 5 is a cross-sectional diagram taken along line II-II' in FIG. 1.
Figure 6:
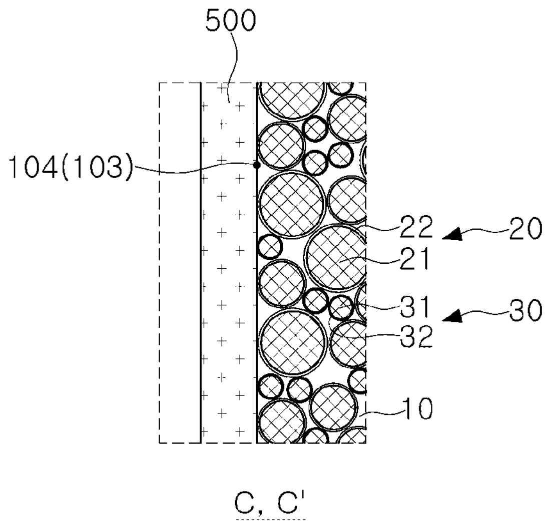
FIG. 6 is an enlarged diagram illustrating portion C in FIG. 5.
Figure 7:
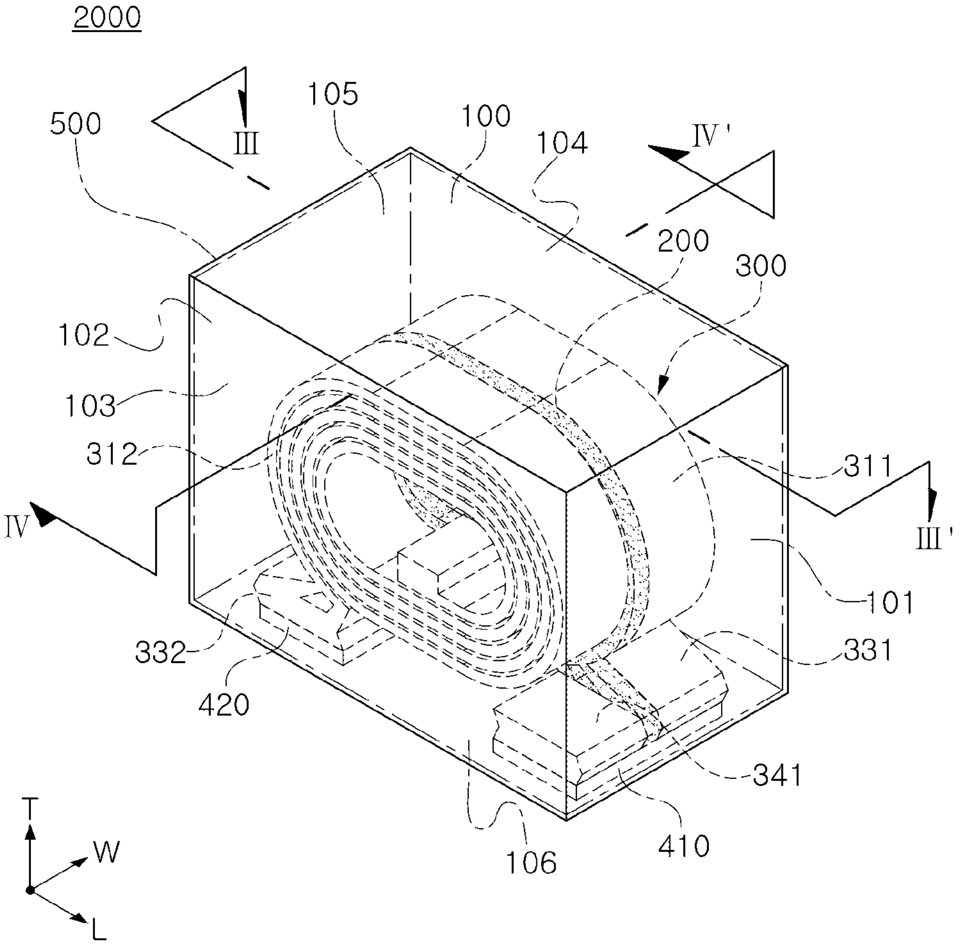
FIG. 7 is a perspective diagram illustrating a coil component according to another example embodiment of the present disclosure.
Figure 8:
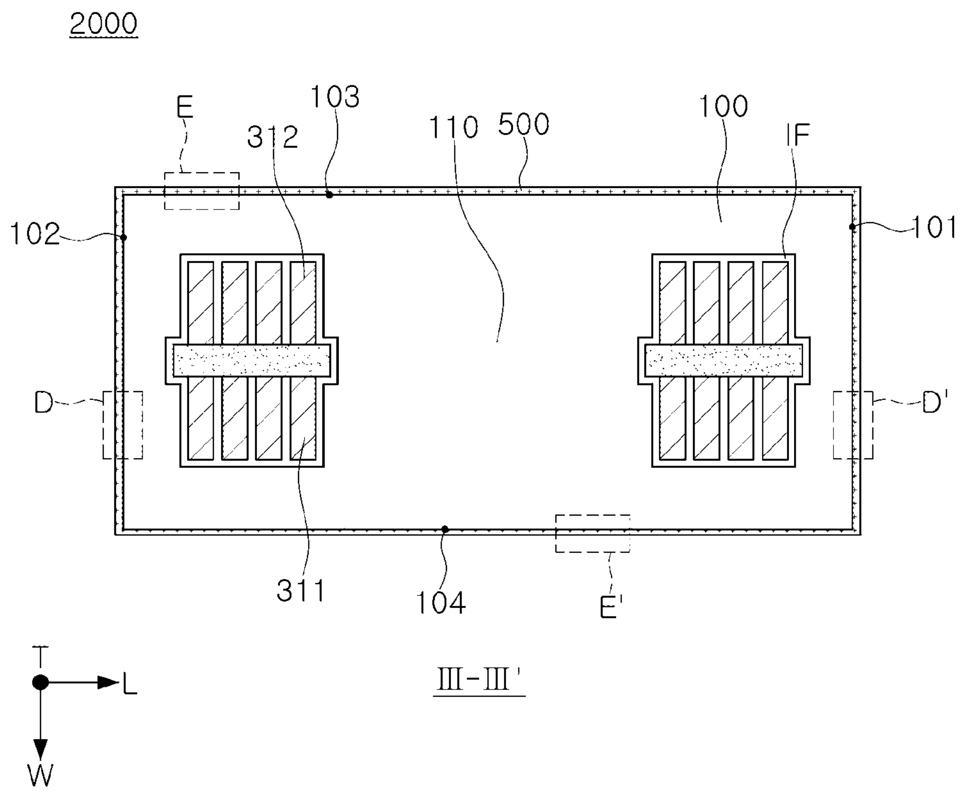
FIG. 8 is a cross-sectional diagram taken along line III-III' in FIG. 7.
Figure 9:
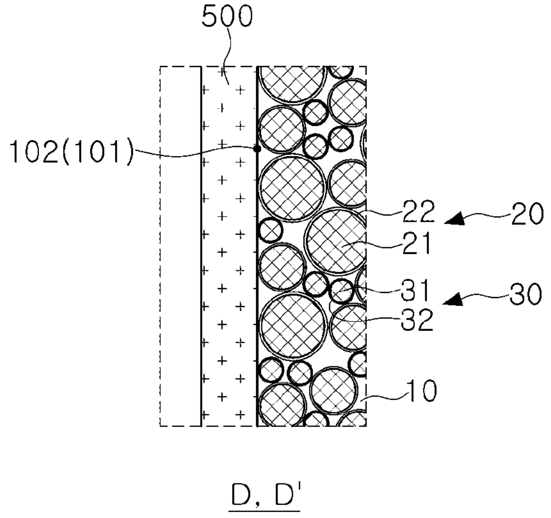
FIG. 9 is an enlarged diagram illustrating portion D in FIG. 8.
Figure 10:
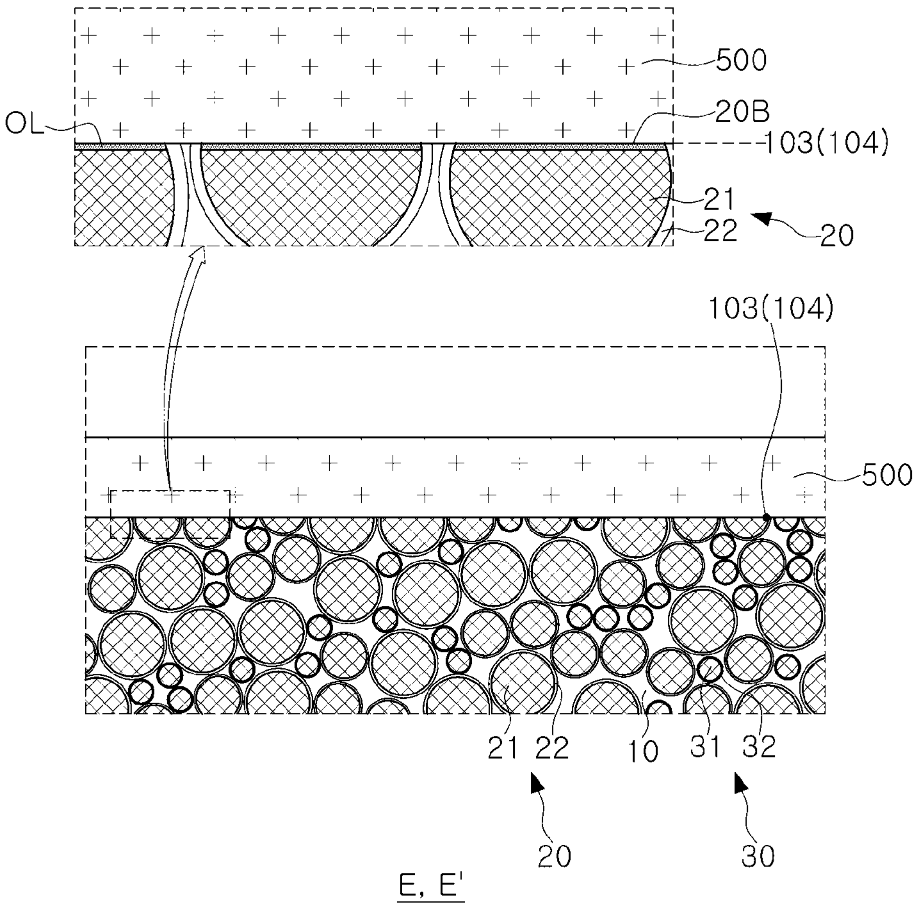
FIG. 10 is an enlarged diagram illustrating portion E in FIG. 8.

FIG. 1 is a perspective diagram illustrating a coil component according to an example embodiment. FIG. 2 is a cross-sectional diagram taken along line I-I' in FIG. 1. FIG. 3 is an enlarged diagram illustrating portion A in FIG. 1. FIG. 4 is an enlarged diagram illustrating portion B in FIG. 1. FIG. 5 is a cross-sectional diagram taken along line II-II' in FIG. 1. FIG. 6 is an enlarged diagram illustrating portion C in FIG. 5. FIG. 7 is a perspective diagram illustrating a coil component according to another example embodiment. FIG. 8 is a cross-sectional diagram taken along line III-III' in FIG. 7. FIG. 9 is an enlarged diagram illustrating portion D in FIG. 8. FIG. 10 is an enlarged diagram illustrating portion E in FIG. 8.

Referring to FIGS. 1 to 10, a coil component 1000 in the example embodiment may include a body 100, a support substrate 200, a coil portion 300, external electrodes 410 and 420, and a surface insulating layer 500, and may further include an insulating layer IF.

The body 100 may form an exterior of the coil component 1000 in the example embodiment, and the support substrate 200 and the coil portion 300 may be disposed in the body 100.

The body 100 may have a hexahedral shape.

With reference to the directions illustrated in FIGS. 1 to 5, the body 100 may include a first surface 101 and a second surface 102 opposing each other in a length direction L, a third surface 103 and a fourth surface 104 opposing each other in a width direction W, and a fifth surface 105 and a sixth surface 106 opposing each other in a thickness direction T. The first to fourth surfaces 101, 102, 103, and 104 of the body 100 may be walls of the body 100 connecting the fifth surface 105 to the sixth surface 106 of the body 100. In the description below, both end surfaces (one end surface and the other end surface) of the body 100 may refer to the first surface 101 and the second surface 102 of the body 100, both side surfaces (one side surface and the other side surface) of the body 100 may refer to the third surface 103 and the fourth surface 104 of the body 100, and one surface and the other surface of the body 100 may refer to the sixth surface 106 and the fifth surface 105 of the body 100, respectively.

The body 100 may be formed such that the coil component 1000 in which the external electrodes 410 and 420 and the surface insulating layer 500 are formed may have a length of 2.0 mm, a width of 1.2 mm, and a thickness of 0.65 mm, for example, but an example embodiment thereof is not limited thereto. The above-mentioned sizes are example sizes determined without consideration of a process error, and an example of the sizes is not limited thereto.

The length of the coil component 1000 described above may refer to a maximum value of dimensions of a plurality of lines connecting two outermost boundaries of the coil component 1000, opposing each other in the length direction L, and parallel to the length direction L, the coil component 1000 illustrated in the image of a cross-sectional surface of a central portion of the coil component 1000 in the width direction W, taken in the length direction L and the thickness direction T, obtained by an optical microscope or a scanning electron microscope (SEM). Alternatively, the length of the coil component 1000 described above may refer to an arithmetic mean value of at least two or more of dimensions of a plurality of lines connecting two outermost boundaries of the coil component 1000 opposing each other in the length direction L and parallel to the length direction L, the coil component 1000 illustrated in the image of the cross-sectional surface.

The thickness of the coil component 1000 described above may refer to a maximum value of dimensions of a plurality of lines connecting two outermost boundaries of the coil component 1000, opposing each other in the thickness direction T, and parallel to the thickness direction T, the coil component 1000 illustrated in the image of a cross-sectional surface of a central portion of the coil component 1000 in the width direction W, taken in the length direction L and the thickness direction T, obtained by an optical microscope or a scanning electron microscope (SEM). Alternatively, the thickness of the coil component 1000 described above may refer to an arithmetic mean value of at least two or more of dimensions of a plurality of lines connecting two outermost boundaries of the coil component 1000, opposing each other in the thickness direction T, and parallel to the thickness direction T, the coil component 1000 illustrated in the image of the cross-sectional surface.

The width of the coil component 1000 described above may refer to a maximum value of a plurality of lines connecting two outermost boundaries of the coil component 1000, opposing each other in the width direction W, and parallel to the width direction W, the coil component 1000 illustrated in the image of a cross-sectional surface of a central portion of the coil component 1000 in the thickness direction T, taken in the length direction L and the thickness direction T, obtained by an optical microscope or a scanning electron microscope (SEM). Alternatively, the width of the coil component 1000 described above may refer to an arithmetic mean value of dimensions of at least two or more of a plurality of lines connecting two outermost boundaries of the coil component 1000, opposing each other in the width direction W, and parallel to the width direction W, the coil component 1000 illustrated in the image of the cross-sectional surface.

Alternatively, each of the length, the width, and the thickness of the coil component 1000 may be measured by a micrometer measurement method. In the micrometer measurement method, a zero point may be set by a gauge repeatability and reproducibility (R&R) micrometer, the coil component 1000 of the example embodiment may be inserted between tips of the micrometer, and the measuring may be performed by rotating a measurement lever of the micrometer. In measuring the length of the coil component 1000 by the micrometer measurement method, the length of the coil component 1000 may refer to a value of the length measured once or an arithmetic mean of values of the length measured multiple times. This configuration may also be applied to the width and the thickness of the coil component 1000.

The body 100 may include magnetic metal powder or powder particles 20 and 30 and insulating resin 10. Specifically, the body 100 may be formed by laminating one or more magnetic composite sheets including the insulating resin 10 and the magnetic metal powder particles 20 and 30 dispersed in the insulating resin 10.

The magnetic metal powder particles 20 and 30 may include one or more selected from a group consisting of iron (Fe), silicon (Si), chromium (Cr), cobalt (Co), molybdenum (Mo), aluminum (Al), niobium (Nb), copper (Cu), and nickel (Ni). For example, the magnetic metal powder particles 20 and 30 may be one or more of a pure iron powder, a Fe—Si alloy powder, a Fe—Si—Al alloy powder, a Fe—Ni alloy powder, a Fe—Ni—Mo alloy powder, Fe—Ni—Mo—Cu alloy powder, a Fe—Co alloy powder, a Fe—Ni—Co alloy powder, a Fe—Cr alloy powder, a Fe—Cr—Si alloy powder, a Fe—Si—Cu—Nb alloy powder, a Fe—Ni—Cr alloy powder, and a Fe—Cr—Al alloy powder.

The magnetic metal powder particles 20 and 30 may be amorphous or crystalline. For example, the magnetic metal powder particles 20 and 30 may be a Fe—Si—B—Cr amorphous alloy powder, but an example embodiment of the magnetic metal powder is not limited thereto. Each of the magnetic metal powder particles 20 and 30 may have an average diameter of about 0.1 μm to 30 μm, but an example embodiment thereof is not limited thereto.

The magnetic metal powder particles 20 and 30 may include a first powder particle 20 and a second powder particle 30 having a smaller particle size than that of the first powder 20. In the example embodiment, the term "particle size" or "average diameter" may refer to a particle size distribution represented by D90 or D50. In the example embodiment, since the magnetic metal powder particles 20 and 30 may include the first powder particle 20 and the second powder particle 30 having a smaller particle size than that of the first powder particle 20, the second powder particle 30 may be disposed in the space between the first powders particle 20, and accordingly, a ratio of the magnetic material in the body 100 may increase as compared to the body 100 having the same volume. In the description below, the magnetic metal powder particles 20 and 30 of the body 100 may include the first powder particle 20 and the second powder particle 30 having different particle sizes for ease of description, but an example embodiment thereof is not limited thereto. As another example, but not limited thereto, the magnetic metal powder may include three types of powder particles having different particle sizes.

Insulating coating layers 22 and 32 may be formed on surfaces of the magnetic metal powder particles 20 and 30. Specifically, the first powder particle 20 may include a first core particle 21, which is conductive, and a first insulating coating layer 22 covering the first core particle 21. The second powder particle 30 may include a second core particle 31, which is conductive, and a second insulating coating layer 32 covering the second core particle 31. The insulating coating layers 22 and 32 may be configured as an oxide film including one of epoxy, polyimide, a liquid crystal polymer, or mixtures thereof, including silica ($SiO_2$) or alumina ($Al_2O_3$), or including metal of the core particles 21 and 31.

The insulating resin 10 may include one of epoxy, polyimide, a liquid crystal polymer, or mixtures thereof, but the example of the resin is not limited thereto.

The magnetic metal powder particles 20 and 30 may be exposed to each of the plurality of wall surfaces 101, 102, 103, and 104 of the body 100. The first surface 20A of the magnetic metal powder particles 20 and 30 may be formed only on the magnetic metal powder particles 20 and 30 exposed to the one wall surfaces 101 and 102 of the body 100 among the magnetic metal powder particles 20 and 30 exposed to each of the plurality of wall surfaces 101, 102, 103, and 104 of the body 100, and may be substantially coplanar with the one wall surfaces 101 and 102 of the body 100. In other words, the magnetic metal powder particles 20 and 30 exposed to the first surface 101 of the body 100 may have the first surface 20A substantially coplanar with the first surface 101 of the body 100. The magnetic metal powder particles 20 and 30 exposed to the second surface 102 of the body 100 may have the first surface 20A substantially coplanar with the second surface 102 of the body 100. The magnetic metal powder particles 20 and 30 exposed to each of the third and fourth surfaces 103 and 104 of the body 100 may not be substantially coplanar with the third and fourth surfaces 103 and 104 of the body 100. One or ordinary skill in the art would understand that the expression "substantially coplanar" refers to lying in the same plane by allowing process errors, positional deviations, and/or measurement errors that may occur in a manufacturing process.

The lead-out patterns 331 and 332 of the coil portion 300 may be exposed to the first and second surfaces 101 and 102 of the body 100, respectively. The exposed surface of the first lead-out pattern 331 exposed to the first surface 101 of the body 100 may be substantially coplanar with the first surface 101 of the body 100. The exposed surface of the second lead-out pattern 332 exposed to the second surface 102 of the body 100 may be substantially coplanar with the second surface 102 of the body 100. Accordingly, the first surface 101 of the body 100, the first surface of the magnetic metal powder particles 20 and 30 exposed to the first surface 101 of the body 100, and the exposed surface of the first lead-out patterns 331 exposed to the first surface 101 of the body 100 may substantially coplanar with one another. The second surface 102 of the body 100, the first surface of the magnetic metal powder particles 20 and 30 exposed to the second surface 102 of the body 100, and the exposed surface of the second lead-out patterns 332 exposed to the second surface 102 of the body 100 may substantially coplanar with one another.

The magnetic metal powder particles 20 and 30 may be exposed to the fifth and sixth surfaces 105 and 106 of the body 100, respectively. The second surface 20B of the magnetic metal powder particles 20 and 30 may be formed on the magnetic metal powder particles 20 and 30 exposed to the fifth and sixth surfaces 105 and 106 of the body 100, and may be substantially coplanar with the fifth and sixth surfaces 105 and 106 of the body 100. Accordingly, the magnetic metal powder particles 20 and 30 exposed to the fifth surface 105 of the body 100 may have the second surface 20B substantially coplanar with the fifth surface 105 of the body 100. The magnetic metal powder particles 20 and 30 exposed to the sixth surface 106 of the body 100 may have the second surface 20B substantially coplanar with the sixth surface 106 of the body 100.

Generally, in the case of a thin-film coil component, a coil bar including a plurality of coils and a plurality of bodies connected to each other may be manufactured on a large-area substrate, and the bodies of the plurality of components may be divided into individual components by performing dicing in parallel to the length direction L and the width direction W of each component. In the example embodiment, in the process of forming the plurality of components to be a coil bar (a primary coil bar), a dummy pattern having a length longer than a dimension of an individual component taken along a length direction may be formed between two individual components adjacent to each other in the width direction W, and a body of each component may be formed with a thickness corresponding to a height of the dummy pattern. The primary coil bar formed as above may be diced in the width direction of the component, and the two components connected to each other in the length direction L may be divided and separated from each other. Once the dicing process is completed, a secondary coil bar in which a plurality of components adjacent to each other in the width direction W are connected to each other may be formed. As described above, since the dummy pattern is formed between the plurality of components adjacent to each other in the width direction W, when the upper and lower surfaces (corresponding to the upper and lower surfaces of the individual components) of the secondary coil bar are configured to be substantially coplanar with the upper and lower surfaces of the dummy pattern, the plurality of components of the secondary coil bar adjacent to each other in the width direction W may be divided and separated from each other without dicing the secondary coil bar in the length direction L. With reference to a body of a single component, since the first and second surfaces 101 and 102 of the body 100 opposing each other in the length direction L is formed by the dicing process, the magnetic metal powder particles 20 and 30 cut out by the dicing saw may be exposed to the first and second surfaces 101 and 102 of the body 100. In other words, the magnetic metal powder particles 20 and 30 exposed to the first and second surfaces 101 and 102 of the body 100 may have the first surface 20A, which may be, for example, a cut-out surface. With reference to a body of a single component, since the third and fourth surfaces 103 and 104 of the body 100 opposing each other in the width direction W are not formed by the dicing process, the magnetic metal powder particles 20 and 30 exposed to the third and fourth surfaces 103 and 104 of the body 100 may not have a cut-out surface. With reference to a body of a single component, since the fifth and sixth surfaces 105 and 106 of the body 100 opposing each other in the thickness direction T may be formed by grinding or polishing the secondary coil bar in the thickness direction T to divide the secondary coil bar into individual components, the magnetic metal powder particles 20 and 30 may be exposed to the fifth and sixth surfaces 105 and 106 of the body 100 by the grinding or the polishing. Accordingly, the magnetic metal powder particles 20 and 30 exposed to the fifth and sixth surfaces 105 and 106 of the body 100 may have the second surface 20B.

An oxide insulating film OL formed of a conductive material of the core particles 21 and 31 may be formed on the first surface 20A of the magnetic metal powder particles 20 and 30.

The oxide insulating film OL may be formed on the first and second surfaces 20A and 20B of the magnetic metal powder particles 20 and 30. The oxide insulating film OL may be formed on the first surface 20A of the magnetic metal powder particles 20 and 30 exposed to the first and second surfaces 101 and 102 of the body 100, may be formed on the second surface 20B of the magnetic metal powder particles 20 and 30 exposed to the fifth and sixth surfaces 105 and 106 of the body 100, and may be configured as an oxide film including the metal of the magnetic metal powder particles 20 and 30. The oxide insulating film OL may be formed by performing an acid treatment on the surfaces 101, 102, 103, 104, 105 and 106 of the body 100 after the dicing process. In this case, since the acid treatment solution may form the oxide insulating film OL by selectively reacting with the exposed magnetic metal powder particles 20 and 30, the oxide insulating film OL may include a metal component of the exposed magnetic metal powder particles 20 and 30.

Due to the relatively porous structure of a cured product of the insulating resin 10 of the body 100, the acid treatment solution may permeate into the surfaces 101, 102, 103, 104, 105, and 106 of the body 100 by a certain depth. Accordingly, the oxide insulating film OL may be formed on the magnetic metal powder particles 20 and 30 of which at least portions are exposed to the surfaces 101, 102, 103, 104, 105, and 106 of the body 100, and may also be formed on at least portions of the surfaces of the magnetic metal powder particles 20 and 30, the surfaces which may not be exposed to the surfaces 101, 102, 103, 104, 105, and 106 of the body 100 and may be disposed within a certain depth from the surfaces 101, 102, 103, 104, 105, and 106 of the body 100. The certain depth from the surfaces 101, 102, 103, 104, 105 and 106 of the body 100 may be defined as a depth of about 0.5 times the particle size of the first powder particle 20.

Since the particle size of the first powder particle 20 is larger than the particle size of the second powder particle 30, the oxide insulating film OL may be formed on the first and second surfaces 20A and 20B of the first powder particle 20 in general. In other words, both the first powder particle 20 and the second powder particle 30 may be disposed within a certain depth from the first, second, fifth and sixth surfaces 101, 102, 105, and 106 of the body 100, and the second powder particle 30 may be dissolved in the acid treatment solution during the acid treatment due to a relatively small particle size. The second powder particle 30 may be dissolved in the acid treatment solution and may form voids V in a region within a certain depth from the first, second, fifth and sixth surfaces 101, 102, 105, and 106 of the body 100. Accordingly, the voids V corresponding to the volume of the second powder particle 30 may remain in the insulating resin 10 disposed within a certain depth from the first, second, fifth and sixth surfaces 101, 102, 105, and 106 of the body 100. As described above, since the particle size of the second powder particle 30 refers to a particle size according to the particle size distribution, the volume of the second powder particle 30 may also refer to the volume distribution. Accordingly, the notion that the volume of the voids V corresponds to the volume of the second powder particle 30 may indicate that the volume distribution of the voids V may be substantially the same as the volume distribution of the second powder particle 30.

The oxide insulating film OL may be formed as at least a portion of the surface thereof is exposed to the surfaces 101, 102, 103, 104, 105, and 106 of the body 100, or as the magnetic metal powder particles 20 and 30 disposed within a certain depth from the surfaces 101, 102, 103, 104, 105, and 106 of the body 100 reacts with acid. Accordingly, as illustrated in FIG. 3, the oxide insulating layer OL may be discontinuously formed on the first and second surfaces 101 and 102 of the body 100. Also, the concentration of oxygen ions in the oxide insulating film OL may decrease from an outer side to an inner side of the magnetic metal powder particles 20 and 30. In other words, since the time in which the surface of the magnetic metal powder particles 20 and 30 is exposed to the acid treatment solution may be longer than the time in which the inner surface is exposed to the solution, the concentration of oxygen ions in the oxide insulating film OL may vary depending on the depth. Accordingly, cracks may be formed in the oxide insulating layer OL due to an imbalance of metal components caused by an oxidation-reduction reaction. For the reasons described above, the oxide insulating film OL in the example embodiment may be distinct from the technique of coating the magnetic metal powder particles 20 and 30 with an oxide film or applying an oxide film to the magnetic metal powder particles 20 and 30.

The body 100 may include a core 110 penetrating the support substrate 200 and the coil portion 300. The core 110 may be formed by filling a through-hole penetrating a central portion of each of the coil portion 300 and the support substrate 200 with a magnetic composite sheet, but an example embodiment thereof is not limited thereto.

The support substrate 200 may be buried in the body 100. The support substrate 200 may support the coil portion 300.

The support substrate 200 may be formed of an insulating material including a thermosetting insulating resin such as an epoxy resin, a thermoplastic insulating resin such as a polyimide, or a photosensitive insulating resin, or may be formed of an insulating material including a reinforcement material such as a glass fiber or an inorganic filler with the above-described insulating resin. For example, the support substrate 200 may be formed of an insulating material such as prepreg, Ajinomoto Build-up Film (ABF), FR-4, a bismaleimide triazine (BT) resin, a photoimageable dielectric (PID), and the like, but an example of the material of the internal insulating layer is not limited thereto.

As an inorganic filler, one or more materials selected from a group consisting of silica ($SiO_2$), alumina ($Al_2O_3$), silicon carbide (SiC), barium sulfate ($BaSO_4$), talc, mud, a mica powder, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$), and calcium zirconate ($CaZrO_3$) may be used.

When the support substrate 200 is formed of an insulating material including a reinforcing material, the support substrate 200 may provide improved stiffness. When the support substrate 200 is formed of an insulating material which does not include a glass fiber, a thickness of the coil component 1000 in the example embodiment may be reduced. Also, with reference to the body 100 having the same size, a volume occupied by the coil portion 300 and/or the magnetic metal powder particles 20 and 30 may increase, such that component properties may improve. When the support substrate 200 is formed of an insulating material including a photosensitive insulating resin, the number of processes for forming the coil portion 300 may be reduced, such that production cost may be reduced, and fine vias may be formed.

The coil portion 300 may be disposed in the body 100 and may exhibit properties of a coil component. For example, when the coil component 1000 is used as a power inductor, the coil portion 300 may store an electrical field as a magnetic field and may maintain an output voltage, thereby stabilizing power of an electronic device.

The coil portion 300 may include coil patterns 311 and 312, via 320 and lead-out patterns 331 and 332. Specifically, with reference to the directions in FIGS. 1, 2, and 5, the first coil pattern 311 and the first lead-out may be disposed on the lower surface of the support substrate 200 opposing the sixth surface 106 of the body 100, and the second coil pattern 312 and the second lead-out pattern 332 may be disposed on the upper surface of the support substrate 200 opposing the lower surface of the support substrate 200. The via 320 may penetrate the support substrate 200 and may be in contact with and connected to internal ends of the first coil pattern 311 and the second coil pattern 312. The first and second lead-out patterns 331 and 332 may be connected to the first and second coil patterns 311 and 312 and may be exposed to the first and second surfaces 101 and 102 of the body 100, and may be connected to the first and second external electrodes 410 and 420, respectively. Accordingly, the coil portion 300 may function as a single coil between the first and second external electrodes 410 and 420.

Each of the first coil pattern 311 and the second coil pattern 312 may have a planar spiral shape forming at least one turn around the core 110 of the body 100. As an example, the first coil pattern 311 may form at least one turn around the core 110 on a lower surface of the support substrate 200.

The lead-out patterns 331 and 332 may be exposed to the first and second surfaces 101 and 102 of the body 100, respectively. For example, the first lead-out pattern 331 may be exposed to the first surface 101 of the body 100, and the second lead-out pattern 332 may be exposed to the second surface 102 of the body 100.

At least one of the coil patterns 311 and 312, the via 320, and the lead-out patterns 331 and 332 may include at least one conductive layer.

As an example, when the second coil pattern 312, the via 320, and the second lead-out pattern 332 are formed on the upper surface side of the support substrate 200 by a plating process, each of the second coil pattern 312, the via 320, and the second lead-out pattern 332 may include a seed layer and an electrolytic plating layer. The electrolytic plating layer may have a single layer structure or a multilayer structure. The electrolytic plating layer having a multilayer structure may be formed in conformal film structure in which an electrolytic plating layer is covered by another electrolytic plating layer, or a structure in which an electrolytic plating layer is only layered on one surface of one of the electrolytic plating layers. The seed layer may be formed by an electroless plating method or a vapor deposition method such as sputtering. The seed layers of the second coil pattern 312, the via 320, and the second lead-out pattern 332 may be integrated with each other such that a boundary may not be formed therebetween, but an example embodiment thereof is not limited thereto. The electrolytic plating layers of the second coil pattern 312, the via 320, and the second lead-out pattern 332 may be integrated with each other such that a boundary may not be formed therebetween, but an example embodiment thereof is not limited thereto.

As another example, when the coil portion 300 is formed by separately forming the first coil pattern 311 and the first lead-out pattern 331 disposed on the lower surface side of the support substrate 200, and the second coil pattern 312 and the second lead-out pattern 332 disposed on the upper surface side of the support substrate 200 and collectively laminating the first coil pattern 311 and the first lead-out pattern 331 and the second coil pattern 312 and the second lead-out pattern 332 on the support substrate 200, the via 320 may include a high melting point metal layer and a low melting point metal layer having a melting point lower than that of the high melting point metal layer. The low melting point metal layer may be formed of solder including lead (Pb) and/or tin (Sn). At least a portion of the low melting point metal layer may be melted due to pressure and temperature during the lamination, and an inter-metallic compound layer (IMC layer) may be formed on the boundary between the low melting point metal layer and the second coil pattern 312.

The coil patterns 311 and 312 and the lead-out patterns 331 and 332 may be formed to protrude from the lower and upper surfaces of the support substrate 200, respectively, as illustrated in FIGS. 1 and 2, for example. As another example, the first coil pattern 311 and the first lead-out pattern 331 may protrude from the lower surface of the support substrate 200, and the second coil pattern 312 and the second lead-out pattern 332 may be buried in the upper surface of the support substrate 200 and the upper surfaces may be exposed to the upper surface of the support substrate 200. In this case, a concave portion may be formed on the upper surface of the second coil pattern 312 and/or the upper surface of the second lead-out pattern 332, such that the upper surface of the support substrate 200 and the upper surface of the second coil pattern 312 and/or the upper surface of the second lead-out pattern 332 may not be disposed on the same plane.

Each of the coil patterns 311 and 312, the via 320, and the lead-out patterns 331 and 332 may be formed of a conductive material such as copper (Cu), aluminum (Al), silver (Ag), tin (Sn), gold (Au), nickel (Ni), lead (Pb), titanium (Ti), chromium (Cr), or alloys thereof, but an example of the material is not limited thereto.

The external electrodes 410 and 420 may be disposed on the body 100, may be spaced apart from each other, and may be connected to the coil portion 300. In the example embodiment, the external electrodes 410 and 420 may include pad portions 412 and 422 disposed on the sixth surface 106 of the body 100 and spaced apart from each other, and connection portions 411 and 421 disposed on the first and second surfaces 101 and 102 of the body 100. Specifically, the first external electrode 410 may include the first connection portion 411 disposed on the first surface 101 of the body 100 and in contact with the first lead-out pattern 331 exposed to the first surface 101 of the body 100, and the first pad portion 412 extending from the first connection portion 411 to the sixth surface 106 of the body 100. The second external electrode 420 may include the second connection portion 421 disposed on the second surface 102 of the body 100 and in contact with the second lead-out pattern 332 exposed to the second surface 102 of the body 100, and the second pad portion 422 extending from the second connection portion 421 to the sixth surface 106 of the body 100. The first and second pad portions 412 and 422 may be disposed on the sixth surface 106 of the body 100 and may be spaced apart from each other. The connection portions 411 and 421 and the pad portions 412 and 422 may be formed together in the same process such that a boundary may not be formed therebetween and may be integrated with each other, but an example embodiment thereof is not limited thereto.

The external electrodes 410 and 420 may be formed by a vapor deposition method such as sputtering and/or a plating method, but an example embodiment thereof is not limited thereto.

The external electrodes 410 and 420 may be formed of a conductive material such as copper (Cu), aluminum (Al), silver (Ag), tin (Sn), gold (Au), nickel (Ni), lead (Pb), chromium (Cr), titanium (Ti), or alloys thereof, but an example of the material is not limited thereto. The external electrodes 410 and 420 may be formed in a single layer structure or multiple layers structure. As an example, the first external electrode 410 may include a first conductive layer including copper (Cu), a second conductive layer disposed on the first conductive layer and including nickel (Ni), and a third conductive layer disposed on the second conductive layer and including tin (Sn). At least one of the second conductive layer and the third conductive layer may be formed to cover the first conductive layer, but an example embodiment thereof is not limited thereto. At least one of the second conductive layer and the third conductive layer may be disposed only on the sixth surface 106 of the body 100, but an example embodiment thereof is not limited thereto. The first conductive layer may be a plating layer or may be a conductive resin layer formed by coating and curing a conductive powder including at least one of copper (Cu) and silver (Ag) and a conductive resin including resin. The second and third conductive layers may be plating layers, but an example embodiment thereof is not limited thereto.

The insulating film IF may be disposed between the coil portion 300 and the body 100, and between the support substrate 200 and the body 100. The insulating layer IF may be formed along the surface of the support substrate 200 on which the coil patterns 311 and 312 and the lead-out patterns 331 and 332 are formed, but an example embodiment thereof is not limited thereto. The insulating layer IF may be configured to insulate the coil portion 300 and the body 100, and may include a generally used insulating material such as paralin, but an example embodiment thereof is not limited thereto. As another example, the insulating layer IF may include an insulating material such as an epoxy resin other than paralin. The insulating layer IF may be formed by a vapor deposition method, but an example embodiment thereof is not limited thereto. As another example, the insulating film IF may be formed by laminating an insulating film for forming the insulating film IF on both surfaces of the support substrate 200 on which the coil portion 300 is formed and curing the film, or may be formed by applying an insulating paste for forming an insulating film IF on both surfaces of the support substrate 200 on which the coil portion 300 is formed and curing the paste. For the reasons described above, the insulating film IF may not be provided in the example embodiment. In other words, in the case in which the body 100 has sufficient electrical resistance at the designed operating current and voltage of the coil component 1000 in the example embodiment, the insulating film IF may not be provided in the example embodiment.

The surface insulating layer 500 may be disposed on the first to sixth surfaces 101, 102, 103, 104, 105, and 106 of the body 100. The surface insulating layer 500 may extend from the fifth surface 105 of the body 100 to at least a portion of the first to fourth and sixth surfaces 101, 102, 103, 104 and 105 of the body 100. In the example embodiment, the surface insulating layer 500 may be disposed on each of the first to fifth surfaces 101, 102, 103, 104, and 105 of the body 100, and may be disposed in a region of the sixth surface 106 of the body 100 other than the region in which the pad portions 412 and 422 are disposed. The surface insulating layer 500 disposed on the first and second surfaces 101 and 102 of the body 100 may cover the connection portions 411 and 422 of the external electrodes 410 and 42

At least portions of the surface insulating layers 500 disposed on the first to sixth surfaces 101, 102, 103, 104, 105, and 106 of the body 100 may be formed in the same process and may be integrated with each other without a boundary therebetween, but an example embodiment thereof is not limited thereto.

The surface insulating layer 500 may include a thermoplastic resin such as polystyrene resin, vinyl acetate resin, polyester resin, polyethylene resin, polypropylene resin, polyamide resin, rubber resin, acrylic resin, or the like, a thermosetting resin such as phenol resin, epoxy resin, urethane resin, melamine resin, alkyd resin, or the like, photosensitive resin, paraline, $SiO_x$, or $SiN_x$. The surface insulating layer 500 may further include an insulating filler such as an inorganic filler, but an example embodiment thereof is not limited thereto.

Accordingly, in the coil component 1000 in the example embodiment, the magnetic metal powder particles 20 and 30 cut by two side surfaces 103 and 104 of the six surfaces of the body 100 among the six surfaces of the body 100 may not be exposed. Accordingly, in dividing and separating the bodies of a plurality of components by dicing the coil bar, the generally used dicing process performed along the length direction L may be omitted. Also, since the core particles of the magnetic metal powder particles 20 and 30 are not exposed to the third and fourth surfaces 103 and 104 of the body 100, leakage current may be reduced. Further, a short-circuit with the other components adjacently mounted in the width direction W on a mounting substrate such as a printed circuit board may be prevented.

Figure 11:
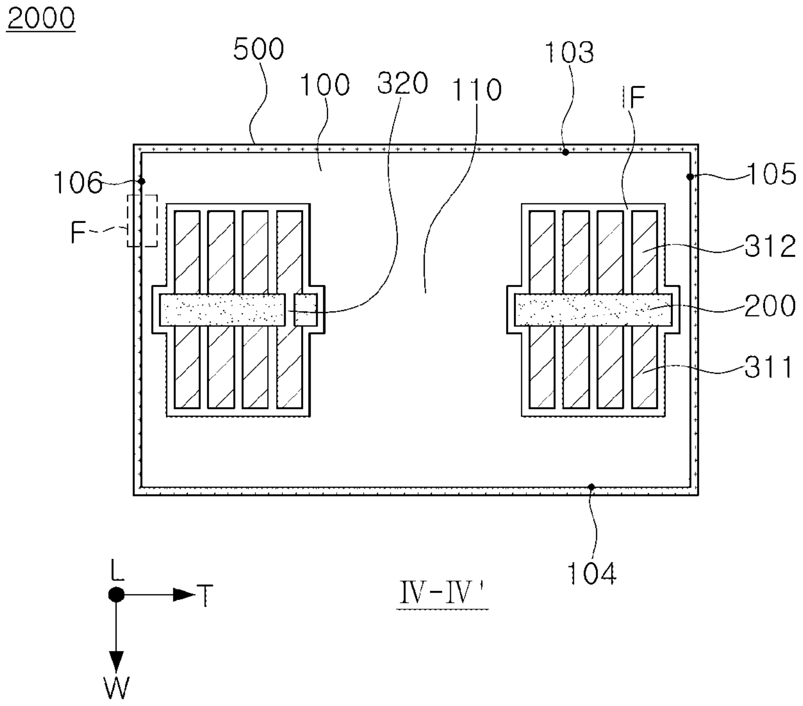
FIG. 11 is a cross-sectional diagram taken along line IV-IV' in FIG. 7.
Figure 12:
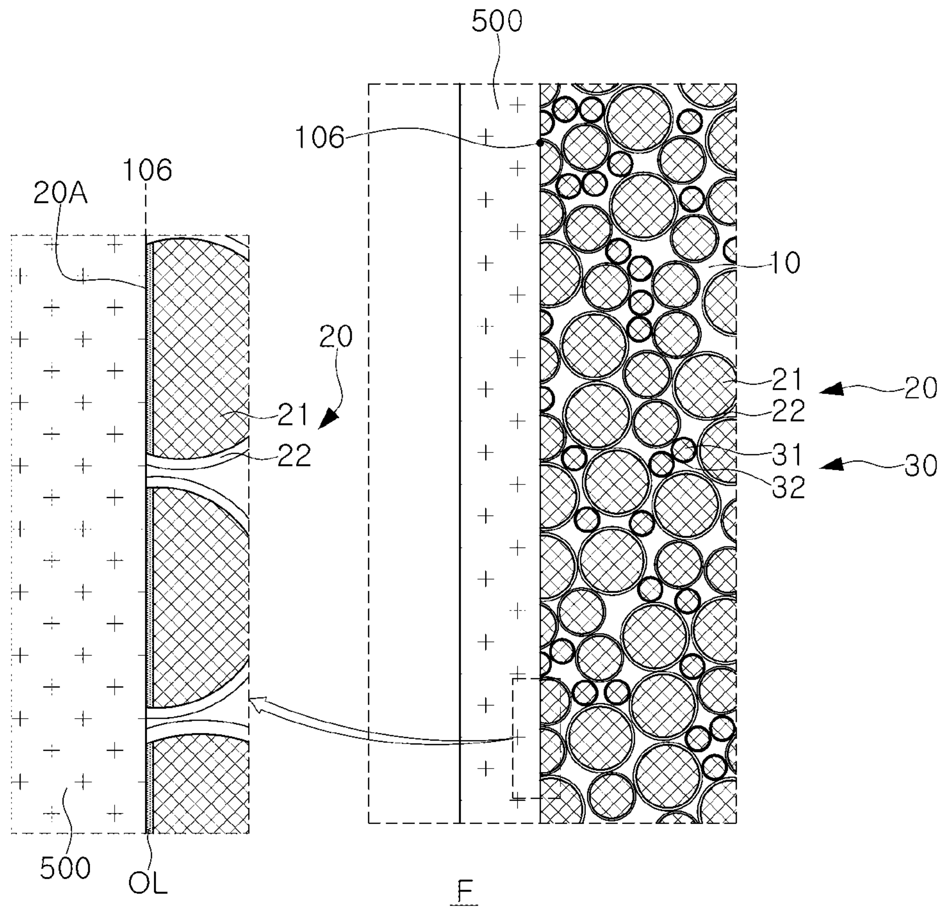
FIG. 12 is an enlarged diagram illustrating portion F in FIG. 11.

FIG. 7 is a perspective diagram illustrating a coil component according to another example embodiment. FIG. 8 is a cross-sectional diagram taken along line in FIG. 7. FIG. 9 is an enlarged diagram illustrating portion D in FIG. 8. FIG. 10 is an enlarged diagram illustrating portion E in FIG. 8. FIG. 11 is a cross-sectional diagram taken along line IV-IV' in FIG. 7. FIG. 12 is an enlarged diagram illustrating portion F in FIG. 11.

Referring to 7 to 12, in a coil component 2000 in the example embodiment, arrangement of the coil portion 300 and the number of surfaces of the body 100 to which the magnetic metal powder particles 20 and 30 having the first surface 20A are exposed may be different from those of the coil component 1000 described in the aforementioned example embodiment. Accordingly, in the example embodiment, only the arrangement of the coil portion 300, and the number of surfaces of the body 100 to which the magnetic metal powder particles 20 and 30 having the first surface 20A are exposed, which may be different from those of the aforementioned example embodiment, will be described, and the same descriptions as in the aforementioned example embodiment may be applied to the other elements of the example embodiment.

Referring to FIGS. 7 to 12, the body 100 may include a first surface 101 and a second surface 102 opposing each other in a length direction L, a third surface 103 and a fourth surface 104 opposing each other in a width direction W, and a fifth surface 105 and a sixth surface 106 opposing each other in a thickness direction T, with reference to FIGS. 7, 8, and 11. The first to fourth surfaces 101, 102, 103, and 104 of the body 100 may be walls of the body 100 connecting the fifth surface 105 to the sixth surface 106 of the body 100. In the description below, both end surfaces (one end surface and the other end surface) of the body 100 may refer to the first surface 101 and the second surface 102 of the body 100, both side surfaces (one side surface and the other side surface) of the body 100 may refer to the third surface 103 and the fourth surface 104 of the body 100, and one surface and the other surface of the body 100 may refer to the sixth surface 106 and the fifth surface 105 of the body 100, respectively.

The body 100 may be formed such that the coil component 1000 in which the external electrodes 410 and 420 and the surface insulating layer 600 are formed may have a length of 1.0 mm, a width of 0.5 mm, and a thickness of 0.8 mm, for example, but an example embodiment thereof is not limited thereto. The above-mentioned sizes are example sizes determined without consideration of a process error, and an example of the sizes is not limited thereto.

The coil portion 300 may be disposed on the support substrate 200. The coil portion 300 may be buried in the body 100 and may exhibit properties of a coil component. The coil portion 300 may be formed on at least one of both surfaces of the support substrate 200 opposing each other, and may format least one turn. The coil portion 300 may be disposed on one surface and the other surface of the support substrate 200 opposing each other in the width direction W of the body 100 and may be disposed to be perpendicular to the sixth surface 106 of the body 100. In the example embodiment, the coil portion 300 may include coil patterns 311 and 312, a via 320, and lead-out portions 331 and 341; 332 and 342.

Each of the first coil pattern 311 and the second coil pattern 312 may have a planar spiral shape forming at least one turn around the core 110 of the body 100. As an example, with reference to the direction in FIG. 7, the first coil pattern 311 may form at least one turn around the core 110 on a rear surface of the support substrate 200. The second coil pattern 312 may form at least one turn around the core 110 on a front surface of the support substrate 200. In each of the first and second coil patterns 311 and 312, an end of the outermost turn connected to the lead-out patterns 331 and 332 may further extend to the sixth surface 106 side of the body 100 than a central portion taken in the thickness direction T of the body 100. Accordingly, in the first and second coil patterns 311 and 322, the number of turns of the entire coil portion 300 may increase as compared to the example in which the ends of the outermost turns of the coil are formed only up to the central portion taken in the thickness direction of the body.

The lead-out portions 331, 341; 332, 342 may include lead-out patterns 331 and 332 and auxiliary lead-out patterns 341 and 342. Specifically, with reference to the direction in FIG. 7, the first lead-out portions 331 and 341 may include the first lead-out pattern 331 extending from the first coil pattern 311 on the rear surface of the support substrate 200 and exposed to the sixth surface 106 of the body 100, and the first auxiliary lead-out pattern 341 disposed on the front surface of the support substrate 200 to correspond to the first lead-out pattern 331 and spaced apart from the second coil pattern 312. With reference to the direction in FIG. 7, the second lead-out portions 332 and 342 may include the second lead-out pattern 332 extending from the second coil pattern 311 on the front surface of the support substrate 200 and exposed to the sixth surface 106 of the body 100, and the second auxiliary lead-out pattern 342 disposed on the rear surface of the support substrate 200 to correspond to the second lead-out pattern 332 and spaced apart from the first coil pattern 311. The first lead-out portions 331 and 341 and the second lead-out portions 332 and 342 may be exposed to the sixth surface of the body 100 and may be spaced apart from each other, and may be in contact with and connected to the first and second external electrodes 410 and 420, respectively. A through-portion penetrating the lead-out patterns 331 and 332 and the auxiliary lead-out patterns 341 and 342 may be formed in the lead-out patterns 331 and 332 and the auxiliary lead-out patterns 341 and 342. In this case, since at least a portion of the body 100 is disposed in the through-portion, the bonding force between the body 100 and the coil portion 300 may improve (an anchoring effect). Further, the through-portion may penetrate the support substrate 200 disposed between the lead-out patterns 331 and 332 and the auxiliary lead-out patterns 341 and 342, but an example embodiment thereof is not limited thereto.

The above-described auxiliary lead-out patterns 341 and 342 may not be provided in the example embodiment in consideration of an electrical connection relationship between the coil portion 300 and the external electrodes 410 and 420, and thus, the example embodiment in which the auxiliary lead-out patterns 341 and 342 are not provided may also be included in example embodiments. In the example in which the auxiliary lead-out patterns 341 and 342 are formed symmetrically to the lead-out patterns 331 and 332 in terms of a position and a size, the external electrodes 410 and 420 formed on the sixth surface 106 of the body 100 may be formed symmetrically, thereby reducing defects in exterior.

The first via 320 may penetrate the support substrate 200 and may connect internal ends of innermost turns of the first and second coil patterns 311 and 312 to each other. The second via may penetrate the support substrate 200 and may connect the first lead-out pattern 331 to the first auxiliary lead-out pattern 341. The third via may penetrate the support substrate 200 and may connect the second lead-out pattern 332 to the second auxiliary lead-out pattern 342. Accordingly, the coil portion 300 may function as a single coil.

As described above, since the auxiliary lead-out patterns 341 and 342 is irrelevant to the electrical connection relationship between the coil portion 300 and the external electrodes 410 and 420, the example in which the second and third vias are not provided may also be included in example embodiments. However, as in the example embodiment, when the lead-out patterns 341 and 342 are connected to the auxiliary lead-out patterns 341 and 342 through the second and third vias, the connection reliability between the coil portion 300 and the external electrodes 410 and 420 may improve.

At least one of the coil patterns 311 and 311, the via 320, the lead-out patterns 331 and 332, and the auxiliary lead-out patterns 341 and 342 may include at least one conductive layer.

As an example, when the second coil pattern 312, the via 320, the second lead-out pattern 332, and the first auxiliary lead-out pattern 341 are formed on the front surface (with reference to the direction in FIG. 7) of the support substrate 200 by plating, each of the second coil pattern 312, the via 320, the second lead-out pattern 332, and the first auxiliary lead-out pattern 341 may include a seed layer and an electrolytic plating layer. The seed layer may be formed by electroless plating or vapor deposition method such as or sputtering. Each of the seed layer and the electrolytic plating layer may have a single layer structure or a multilayer structure. The electrolytic plating layer having a multilayer structure may be formed in conformal film structure in which an electrolytic plating layer is covered by another electrolytic plating layer, or a structure in which an electrolytic plating layer is only layered on one surface of one of the electrolytic plating layers. The seed layers of the second coil pattern 312, the via 320, and the second lead-out pattern 332 may be integrated with each other such that a boundary may not be formed therebetween, but an example embodiment thereof is not limited thereto. The electrolytic plating layers of the second coil pattern 312, the via 320, and the second lead-out pattern 332 may be integrated with each other such that a boundary may not be formed therebetween, but an example embodiment thereof is not limited thereto.

Each of the coil patterns 311 and 312, the via 320, the lead-out patterns 331 and 332 and the auxiliary lead-out patterns 341 and 342 may include a conductive material such as copper (Cu), aluminum (Al), silver (Ag), tin (Sn), gold (Au), nickel (Ni), lead (Pb), titanium (Ti), chromium (Cr), molybdenum (Mo) or alloys thereof, but an example of the material is not limited thereto.

In the example embodiment, since the coil portion 300 is disposed perpendicular to the sixth surface 106 of the body 100, the mounting surface, the volume of the body 100 and the coil portion 300 may be maintained and a mounting area may be reduced. Accordingly, a larger number of electronic components may be mounted on a same-sized mounting substrate. Also, in the example embodiment, since the coil portion 300 is disposed perpendicular to the sixth surface 106 of the body 100, the mounting surface, the direction of a magnetic flux induced to the core 110 by the coil portion 300 may be parallel to the sixth surface 106 of the body 100. Accordingly, noise induced on the mounting surface of the mounting substrate may be relatively reduced.

The first surface 20A of the magnetic metal powder particles 20 and 30 may be formed only on the magnetic metal powder particles 20 and 30 exposed to the sixth surface 106 of the body 100. The second surface 20B of the magnetic metal powder particles 20 and 30 may be formed only on the magnetic metal powder particles 20 and 30 exposed to the third and fourth surfaces 103 and 104 of the body 100. In other words, the magnetic metal powder particles 20 and 30 may be exposed to each of the first to sixth surfaces 101, 102, 103, 104, 105, and 106 of the body 100, and the first surface 20A, a cut-out surface, and the second surface 20B, a ground surface or a polished surface, may not be formed on the magnetic metal powder particles 20 and 30 exposed to each of the first, second and fifth surfaces 101, 102 and 105 of the body 100.

In the example embodiment, since the magnetic composite sheets for forming the primary coil bar area laminated in the width direction W of the individual components, the grinding process to expose the dummy pattern described above may be performed on the third and fourth surfaces of the body 100. Accordingly, the magnetic metal powder particles 20 and 30 exposed to the third and fourth surfaces 103 and 104 of the body 100 may have the second surface 20B, a ground surface or a polished surface. In the example embodiment, the dummy pattern above-described may be disposed between the components adjacent to each other in the length direction L in the primary coil bar and between the components adjacent to each other and vicinity to the fifth surface 105 of the body 100 among two components adjacent to each other in the thickness direction T. Therefore, with reference to the individual component, since each of the first, second, and fifth surfaces 101, 102, and 105 of the body 100 is not formed by the dicing process, the magnetic metal powder particles having the cut-out surface may not be exposed to each of the first, second, and fifth surfaces 101, 102, and 105 of the body 100.

In the example embodiment, the components may be divided and separated from each other by performing the dicing process only on the sixth surface 106 of the body 100. Accordingly, the process of dicing the coil bar may be further omitted. Also, since the core particles of the magnetic metal powder particles 20 and 30 are not exposed to the first, second and fifth surfaces 101, 102, and 105 of the body 100, leakage current may be reduced. Further, a short-circuit with the other components adjacently mounted in the length direction L on a mounting substrate such as a printed circuit board may be prevented.

According to the aforementioned example embodiments, a dicing process performed along the length direction L and the width direction W of the coil component may be omitted.

While the example embodiments have been illustrated and described above, it will be apparent to those skilled in the art that modifications and variations could be made without departing from the scope of the present invention as defined by the appended claims.

What is claimed is:

1. A coil component, comprising:

a body having a first surface and a second surface opposing each other and a plurality of wall surfaces connecting the first surface to the second surface, and including insulating resin and magnetic metal powder particles;

an insulating substrate disposed in the body;

a coil portion disposed on the insulating substrate and including a lead-out pattern exposed to a first wall surface of the plurality of wall surfaces of the body; and an external electrode disposed on the body and connected to the lead-out pattern, wherein each of the plurality of wall surfaces of the body has at least one of the magnetic metal powder particles exposed thereto, wherein the at least one of the magnetic metal powder particles exposed to the first wall surface of the body has a cut-out surface, and wherein the at least one of the magnetic metal powder particles exposed to a second wall surface connected to the first wall surface of the plurality of wall surfaces of the body does not have a cut-out surface.

2. The coil component of claim 1, wherein the cut-out surface of the at least one of the magnetic metal powder particles is substantially coplanar with an exposed surface of the lead-out pattern exposed to the first wall surface of the body.

3. The coil component of claim 1, wherein the magnetic metal powder particles each include a conductive core particle and an insulating coating layer coating the core particle, and wherein the core particle is exposed to the cut-out surface of the at least one of the magnetic metal powder particles.

4. The coil component of claim 3, wherein an oxide insulating film of a conductive material of the core particle is disposed on the cut-out surface of the at least one of the magnetic metal powder particles.

5. The coil component of claim 1, wherein the magnetic metal powder particles exposed to the first surface and the second surface of the body have a polished surface.

6. The coil component of claim 5, wherein the plurality of wall surfaces of the body have a first side surface and a second side surface opposing each other, and a first end surface and a second end surface connecting the first side surface to the second side surface and opposing each other, wherein the lead-out pattern includes a first lead-out pattern exposed to the first end surface of the body and a second lead-out pattern exposed to the second end surface of the body, wherein the magnetic metal powder particles exposed to the first end surface and the second end surface of the body have a cut-out surface, and wherein the magnetic metal powder particles exposed to the first side surface and the second side surface of the body do not have a cut-out surface.

7. The coil component of claim 6, wherein the magnetic metal powder particles exposed to the first side surface and the second side surface of the body are not coplanar with the first side surface and the second side surface of the body, respectively.

8. The coil component of claim 6, wherein the external electrode includes a first external electrode disposed on the first end surface of the body, in contact with the first lead-out pattern, and extending to the first surface of the body, and a second external electrode disposed on the second end surface of the body, in contact with the second lead-out pattern, and extending to the first surface of the body.

9. The coil component of claim 5, wherein the plurality of wall surfaces of the body have a first side surface and a second side surface opposing each other, and a first end surface and a second end surface connecting the first side surface to the second side surface and opposing each other, wherein the lead-out pattern includes first and second lead-out patterns respectively exposed to the first and second end surfaces of the body and spaced apart from each other, and wherein only the at least one of the magnetic metal powder particles exposed to the first end surface of the body has the cut-out surface.

10. The coil component of claim 9, wherein the magnetic metal powder particles exposed to the first side surface, the second side surface, and the second end surface of the body are not coplanar with the first side surface, the second side surface, and the second end surface of the body, respectively.

11. A coil component, comprising:

a body having a first surface and a second surface opposing each other and a plurality of wall surfaces connecting the first surface to the second surface, and including insulating resin and magnetic metal powder particles;

a coil portion disposed in the body and including a lead-out pattern exposed to a first wall surface of the plurality of wall surfaces of the body; and an external electrode disposed on the first surface of the body and connected to the lead-out pattern, wherein each of the plurality of wall surfaces of the body has at least one of the magnetic metal powder particles exposed thereto, wherein an exposed portion of the at least one of the magnetic metal powder particles exposed to the first wall surface of the body has a substantially flat surface, and wherein an exposed portion of the at least one of the magnetic metal powder particles exposed to a second wall surface connected to the first wall surface of the body of the plurality of wall surfaces of the body does not have a substantially flat surface.

12. The coil component of claim 11, wherein the substantially flat surface of the at least one of the magnetic metal powder particles is substantially coplanar with an exposed surface of the lead-out pattern exposed to the first wall surface of the body.

13. The coil component of claim 11, wherein the magnetic metal powder particles each include a conductive core particle and an insulating coating layer coating the core particle, and wherein the core particle is exposed to the substantially flat surface of the at least one of the magnetic metal powder particles.

14. The coil component of claim 13, wherein an oxide insulating film of a conductive material of the core particle is disposed on the substantially flat surface of the at least one of the magnetic metal powder particles.

15. The coil component of claim 11, wherein the plurality of wall surfaces of the body have a first side surface and a second side surface opposing each other, and a first end surface and a second end surface connecting the first side surface to the second side surface and opposing each other, wherein the lead-out pattern includes a first lead-out pattern exposed to the first end surface of the body and a second lead-out pattern exposed to the second end surface of the body, wherein the magnetic metal powder particles exposed to the first end surface and the second end surface of the body have a cut-out surface, and wherein the magnetic metal powder particles exposed to the first side surface and the second side surface of the body do not have a cut-out surface.

16. The coil component of claim 15, wherein the magnetic metal powder particles exposed to the first side surface and the second side surface of the body do not have a substantially flat surface.

17. A coil component, comprising:

a body including insulating resin and magnetic metal powder particles;

an insulating substrate disposed in the body;

a coil portion disposed on the insulating substrate and including a lead-out pattern exposed from the body; and an external electrode disposed on the body and connected to the lead-out pattern, wherein each of external surfaces of the body has at least one of the magnetic metal powder particles exposed thereto, and wherein, among all of the magnetic metal powder particles included in the body, only the at least one of the magnetic metal powder particles exposed to a first surface of the body, to which the lead-out pattern is exposed, has a cut-out surface.

18. The coil component of claim 17, wherein the at least one of the magnetic metal powder particles exposed to a second surface of the body, connected to the first surface of the body, does not have a cut-out surface.

19. The coil component of claim 18, wherein the body has a third surface connected to the first and second surfaces of the body, and the at least one of the magnetic metal powder particles exposed to the third surface of the body has a substantially flat surface.

20. The coil component of claim 19, wherein an oxide insulating film is disposed on the cut-out surface of the at least one of the magnetic metal powder particles exposed to the first surface of the body, and an oxide insulating film is disposed on the substantially flat surface of the at least one of the magnetic metal powder particles exposed to the third surface of the body.

* * * * *